United States Patent [19]

Young

[11] Patent Number: 5,261,512
[45] Date of Patent: Nov. 16, 1993

[54] BRAKE SHOE ASSEMBLY WITH SEALING LINER

[75] Inventor: Gordon Young, Brantford, Canada

[73] Assignee: Rome Tool & Die Co., Inc., Rome, Ga.

[21] Appl. No.: 941,518

[22] Filed: Sep. 8, 1992

[51] Int. Cl.$^5$ .............................................. F16D 69/04
[52] U.S. Cl. ........................... 188/250 B; 188/234; 188/250 G; 188/264 G
[58] Field of Search ............ 188/73.1, 250 B, 250 A, 188/250 C, 250 R, 250 E, 250 G, 251 R, 251 A, 264 G, 218 A, 255, 73.2, 73.37, 258, 242, 243, 247, 248, 251 M, 234

[56] References Cited

U.S. PATENT DOCUMENTS

| | | |
|---|---|---|
| 441,215 | 11/1890 | Wheless ................. 188/250 B X |
| 1,796,433 | 3/1931 | Blume .................... 188/250 G X |
| 2,158,337 | 5/1939 | Rasmussen ................ 188/264 G |
| 2,581,926 | 1/1952 | Groten et al. ............ 188/250 G X |
| 2,809,130 | 10/1957 | Rappaport ............... 188/250 A X |
| 2,879,866 | 3/1959 | Newell .................... 188/242 X |
| 3,064,769 | 11/1962 | Billmeyer ................. 188/234 X |
| 3,477,551 | 11/1969 | Beuchle et al. ........... 188/250 B |
| 3,851,724 | 12/1974 | Banks, Jr. ................. 188/382 X |
| 3,918,555 | 11/1975 | Rath ...................... 188/250 R X |
| 3,956,548 | 5/1976 | Kovac et al. .............. 188/73.1 X |
| 4,373,615 | 2/1983 | Melinat ................... 188/73.37 X |
| 4,858,732 | 8/1989 | Taylor, Jr. ................ 188/250 G |

FOREIGN PATENT DOCUMENTS

| | | |
|---|---|---|
| 0415381 | 3/1991 | European Pat. Off. ........ 188/250 B |
| 2259770 | 6/1973 | Fed. Rep. of Germany ... 188/250 E |
| 2327548 | 12/1974 | Fed. Rep. of Germany ... 188/250 G |
| 3109992 | 9/1982 | Fed. Rep. of Germany ... 188/250 G |
| 0054873 | 5/1977 | Japan ..................... 188/250 E |
| 0211031 | 12/1983 | Japan ..................... 188/264 G |
| 0051629 | 2/1990 | Japan ..................... 188/250 G |

*Primary Examiner*—Douglas C. Butler
*Attorney, Agent, or Firm*—Hopkins & Thomas

[57] ABSTRACT

The present invention relates to a brake shoe assembly with a sealing liner having a brake shoe (11) which includes a brake shoe table (13). A sealing liner (45) formed from an adhesive material is applied to the convex surface (31) of the brake shoe table (13). A friction brake liner (50) is positioned over the sealing liner and convex surface (31) of the brake shoe table (13) and is secured to the brake shoe table (13) by fasteners (61). The sealing liner forms a moisture barrier between the friction brake liner (50) and the brake shoe table (13) to retard the passage of moisture therethrough to prevent rust and corrosion of the brake shoe (11).

11 Claims, 2 Drawing Sheets

BRAKE SHOE ASSEMBLY WITH SEALING LINER

FIELD OF THE INVENTION

The present invention relates in general to brake shoes. More particularly, the present invention relates to a brake shoe assembly having a sealing liner applied between the brake shoe table and the frictional brake liner applied thereto for sealing the brake shoe table against moisture to prevent corrosion.

BACKGROUND OF THE INVENTION

The brake assemblies of large industrial utility vehicles such as dump trucks, tractor and trailer rigs, and the like are subjected to extreme forces during braking operations. Accordingly, brake assemblies and the components therefor are specially designed to withstand the high heat and stresses created during braking. A problem that remains, however, is rusting and corrosion of the brake shoe. Such corrosion usually is due to the collection of moisture on the brake shoe, including on the brake shoe table, and the presence of moisture can lead to premature failure of the brake shoe, necessitating its removal and replacement.

Brake shoes typically are unprotected from below the vehicle. As a result, spray from the road surface tends to be directed toward and collected on brake shoes, causing the brake shoes to rust. This problem is especially prevalent near the sea shore where salt is present on the roads and in areas of abundant rain and snow falls. The problem is further compounded by salt and other corrosive elements often applied to roads in areas of heavy snow falls to melt snow and ice.

Additionally, frictional brake liners for brake shoe assemblies were formerly made of asbestos, which provided a relatively high degree of flexibility to the brake liners. The flexibility of the liners enabled the brake liners to bend and tightly conform to the curvature of the brake shoe table to create a tight sealing contact between the brake liners and the brake shoe table. The tight fit between the brake liner and the table of the brake shoe avoided the presence of gaps being formed between the brake liner and the brake shoe table and therefore avoided moisture being collected between the brake liner and the brake shoe table. However, due to health and safety concerns, the use of asbestos for such applications is now avoided.

The frictional brake liners that are now being used typically are formed from high strength substantially rigid materials, which do not have the flexibility of the old asbestos brake liners. As a result of being stiff, the newer conventional brake liners do not always accurately mate with the brake shoe tables as well as did the old asbestos brake liners. Accordingly, gaps or cracks are often formed between the brake liners and the brake shoe tables, which enables moisture to accumulate between the liner and the table of the brake shoe.

To correct these gaps and provide a tighter sealing fit between the brake liners and brake shoe tables, most brake manufacturers typically rework or "coin" the tables of their brake shoes after manufacture to achieve a radius that better fits the radius of the brake liner. Such a process increases the cost of the brake shoes and does not completely eliminate the gaps or cracks between the brake liners and the brake shoe tables. As a result, moisture is still able to reach the brake shoe table of some brake shoes.

Further, the methods of attachment of the brake liners to the brake shoes have contributed to the contact of moisture with the brake shoe tables. In the past, rivets or bolts have been used to attach the brake liners to the brake shoe table. Such fasteners require holes to be drilled through the brake liner and through the brake shoe table. These fastener holes enable the passage of moisture through the brake liner and brake shoe.

Recently, heat induced epoxies have been utilized to attach the brake liner to the brake shoe table. The epoxies are applied to the brake shoe table as a molten adhesive, filling any gaps between the brake shoe table and the brake liner. The epoxies are then allowed to cool and set, forming a rigid non-fluid attachment between the brake liner and the brake shoe table. However, once these adhesives dry, they form a hard, solid layer which tends to crack and break over time under high heat and stress, thus forming gaps and cracks between the brake liner and the brake shoe table. As a result, moisture can still eventually pass to the brake shoe table through the cracks in the epoxy.

Accordingly, it can be seen that it would be desirable to provide a brake shoe assembly having a means for sealing the brake shoe against contact with or the passage therethrough of moisture, to prevent the rusting and corrosion of the brake shoe.

SUMMARY OF THE INVENTION

Briefly described, the present invention comprises a sealed brake shoe assembly for an automobile such as a truck, dump truck, truck and trailer assembly, or other load carrying vehicle. The brake shoe assembly typically includes a web typically formed from one or more curved struts or runners, a curved brake shoe table mounted on the web, and a friction brake liner mounted on the brake shoe table for engagement with the rotary brake drum. The struts are formed from steel or a similar high strength metal and extend parallel to and are spaced from each other in an arcuate shape. Notches and holes are formed in one or both of the ends of the struts of the web of the brake shoe for engagement with anchor pins, roller pins, return springs, and other elements for securing and moving the brake shoes within the vehicle braking assembly.

The brake shoe table usually is a substantially rectangularly shaped plate formed from the same high strength metal, such as steel, and the brake shoe web and is curved to correspond to the arcuate shape of the brake drum of the wheel of the vehicle.

An adhesive sheet is applied to the convex surface of the brake shoe table, between the brake shoe table and the friction liner. The adhesive sheet typically is a thin film or layer of a high temperature adhesive, which remains substantially fluid and pliable without deteriorating even at the high temperatures generated during braking, and functions as sealing liner between the table and the friction liner. The adhesive sheet is substantially rectangularly shaped and sized to correspond to the size and shape of the brake shoe table to provide substantially complete coverage of the upper surface of the brake shoe table.

The friction brake liner is mounted to the convex surface of the brake shoe table, substantially covering the convex surface of the brake shoe table, with the adhesive sheet positioned between the friction liner and the upper surface of the brake shoe table. The friction liner typically includes one or more brake pads formed from a high strength frictional material such as a steel wool or metal alloy material. The brake pads usually are substantially rectangularly shaped blocks and are curved about a radius corresponding approximately to the radius of the brake shoe table.

Fasteners, such as rivets or bolts, are driven through the brake pads and through the adhesive sheet and the brake shoe table. The fasteners attach the brake pads to the brake shoe table with the adhesive sheet engaged therebetween. The adhesive sheet creates a moisture and vapor barrier between the brake pads and the upper surface of the brake shoe table to retard the passage of moisture therethrough and into contact with the brake shoe table in order to prevent rust and corrosion of the brake shoe.

Thus, it is an object of this invention to provide a brake shoe that is substantially sealed against the accumulation of moisture between the friction liner and the brake shoe table to which the friction liner is mounted to prevent rust and corrosion of the brake shoe table.

Another object of this invention is to provide a brake shoe assembly having a sealing liner applied to the brake shoe table and formed from a substantially fluid adhesive means that fills and seals any gaps between the friction liner and the brake shoe table to form a moisture barrier therebetween.

Another object of this invention is to provide a brake shoe assembly having a sealing liner formed from an adhesive that is sufficiently fluid under extreme temperatures to fill and seal any gaps between the brake shoe table and the friction liner without requiring reworking of the brake shoe table to achieve a sealing engagement between the brake shoe table and the brake friction liner pads.

Another object of this invention is to provide a brake shoe assembly with a sealing liner between the brake shoe table and the friction liner of the brake shoe assembly that is easy and economical to manufacture.

Other objects, features, and advantages of the present invention will become apparent upon reading the following detailed description, when taken in conjunction with the accompanying drawings.

DESCRIPTION OF THE PREFERRED EMBODIMENTS

Figure 1:
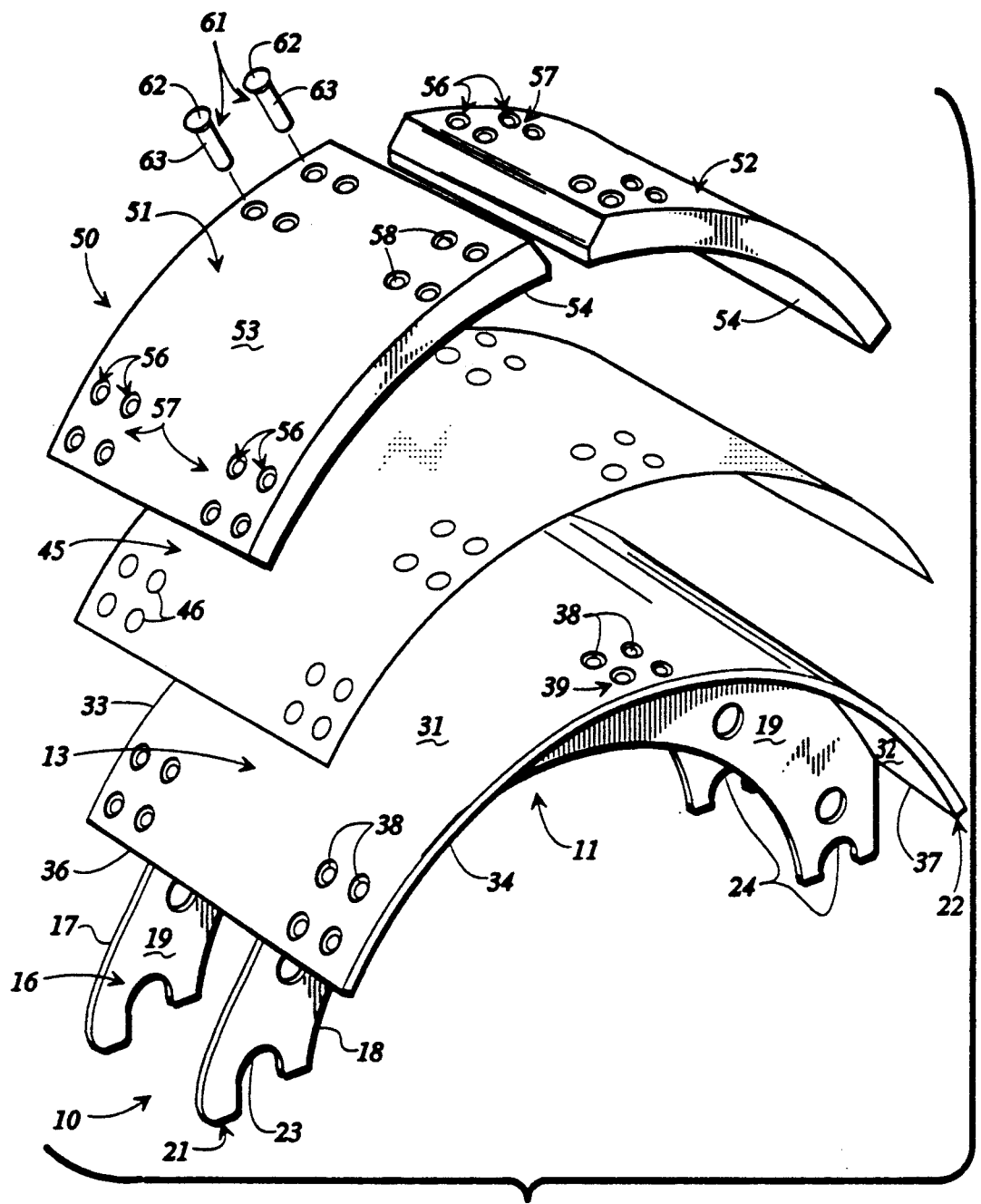
FIG. 1 is an exploded view in perspective of the brake shoe assembly with sealing liner.

Referring now in greater detail to the drawings in which like numerals indicate like parts throughout the several views, FIG. 1 illustrates in exploded perspective the brake shoe assembly with sealing liner 10 for vehicles such as automobiles and trucks. As illustrated in FIG. 1, the brake shoe assembly with sealing liner 10 includes an arcuate shaped brake shoe 11 The brake shoe 11 includes a semicircular web 12 and a curved brake shoe table 13 mounted over the web in an overlapping relationship. As FIG. 1 illustrates, the web 12 typically includes a pair of arcuately shaped struts or runners 14 and 16, although it will be understood that a single strut can be used to form the web. Each strut 14 and 16 is formed from a high strength metal such as a high tensile strength steel. Each strut has a curved outer convex edge 17, a curved inner concave edge 18, substantially flat side surfaces 19, and first and second ends 21 and 22. Each strut is curved about a predefined radius as required to fit the desired braking assembly. Substantially semicircular notches 23 and 24 are formed at the first and second ends respectively of the struts 14 and 16 for engaging the anchor pin and roller of a braking assembly and for rotatably securing the brake shoes to the anchor pins.

As illustrated in FIG. 1, the brake shoe table 13 is mounted to the outer convex edges 17 of the struts 14 and 16 of the web 12 of the brake shoe 11 as by welding. The brake shoe table is a generally rectangularly shaped plate formed from the same high tensile strength steel or similar high strength metal as the struts of the web. The brake shoe table is curved about a radius that corresponds approximately to the radius of the web 12 of the brake shoe and to the inside surface of the brake drum. The brake shoe table includes a convex surface 31 that faces away from the web 12, a concave surface 32 that extends parallel and is attached to the convex outer edges 17 of the struts 14 and 16 of the web, and a series of side edges 33, 34, 36, and 37, at the periphery of the brake shoe table. As illustrated in FIG. 1, the brake shoe table is positioned over the convex outer edges 17 of the struts 14 and 16, with the struts 14 and 16 spaced apart from each other and with side edges 33 and 34 of the brake shoe table substantially overlapping the convex edges of the struts in a substantially T-shaped configuration.

A plurality of fastener openings 38 are formed through the brake shoe table adjacent the side edges 33, 34, 36, and 37 of the brake shoe table for the insertion of fasteners therethrough. The fastener openings are generally cylindrically shaped bores arranged in groups 39, here illustrated as being groups of four fastener openings. It will, however, be understood that while groups of four fastener openings are illustrated herein, groups of greater or lesser numbers of fastener openings, i.e. two fastener openings, can be formed therethrough as desired.

Figure 2:
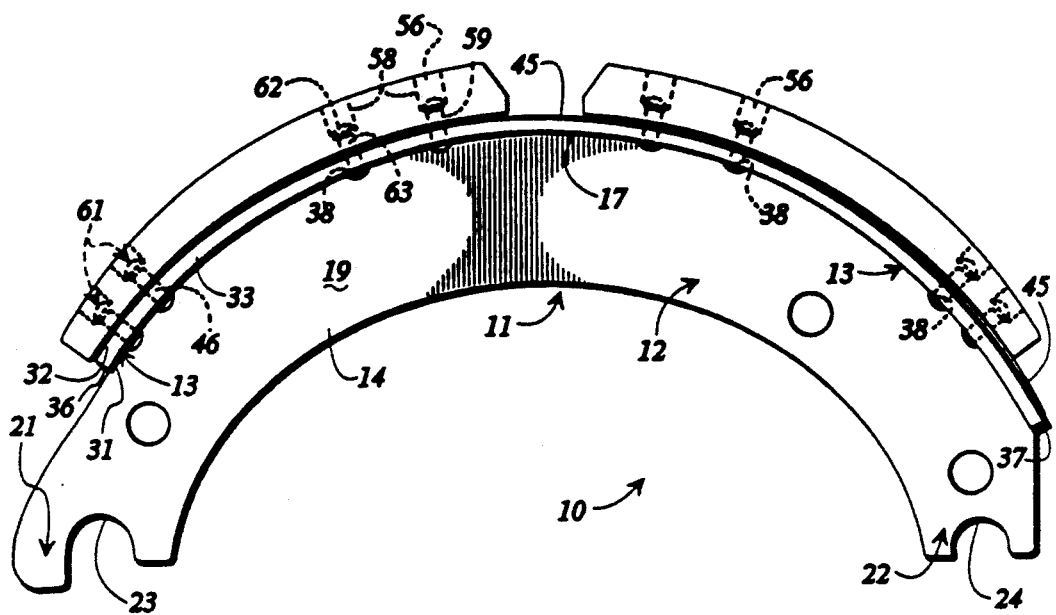
FIG. 2 is a side elevational view of an assembled brake shoe with an adhesive sheet applied to the brake shoe table.
Figure 3:
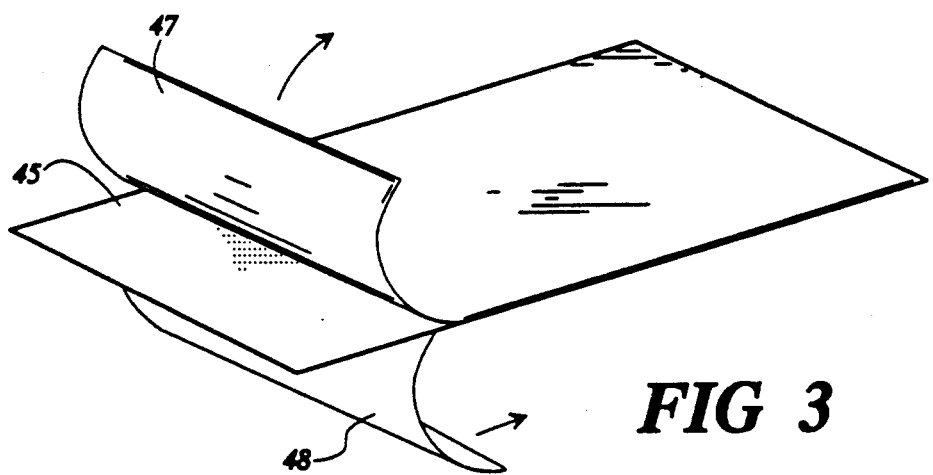
FIG. 3 is a perspective view of the sealing liner, showing how the backing sheets are peeled away to expose the adhesive faces of the liner.

As FIGS. 1 and 2 illustrate, an adhesive sheet 45 is applied to the convex surface 31 of the brake shoe table 13. The adhesive sheet 45 typically is a thin film or layer having a thickness of approximately five milliliters (ml) and having a substantially rectangular shape and size approximately corresponding to the shape and size of the brake shoe table. The adhesive sheet is a high-temperature adhesive generally composed of an acrylic/-polymer material or a urethane base adhesive material. The adhesive sheet is designed to function as a sealing liner or membrane to provide a relatively strong adhesive bond under both severe shear and pull conditions created during braking. The adhesive material of the adhesive sheet generally remains sufficiently fluid over a wide range of temperatures of approximately −50° F. up to approximately 800° F. without deteriorating to enable the adhesive to flow or spread as pressure is applied. As illustrated in FIG. 3, the adhesive sheet 45 is a double-sided adhesive film or strip typically cut from a roll in a length approximately equal to the length of the brake shoe table, and has a pair of adhesive faces to which peelable backing layers 47 and 48 are applied to protect the adhesive when not in use. A first one of the backing layers is peeled away to reveal one of the adhesive faces for application of the adhesive sheet to the brake shoe table. After the exposed surface of the adhesive sheet has been applied to the brake shoe table, the other peelable backing layer is removed and a friction liner 50 (FIG. 1) is applied to the adhesive sheet and the brake shoe table.

As shown in FIG. 1, a series of openings 46 are formed in the adhesive sheet aligned with the fastener openings 38 of the brake shoe table 13. The openings in the adhesive sheet are formed when the openings in the friction brake liner and the brake shoe table are properly aligned, and the fasteners are inserted through the brake shoe table, the friction brake liner and the adhesive sheet. This action results in the plastic flow of the material that is a composite of the adhesive sheet to surround and encase the fasteners. This provides an insulating barrier that helps to prevent galvanic action that may result from dissimilar metals in the brake shoe table and the fasteners.

The friction brake liner 50 generally includes a pair of brake pads 51 and 52, although it will be understood by those skilled in the art that several smaller brake pads or a single brake pad of approximately double the size of one of the brake pads 51 or 52 could be utilized instead. Each brake pad 51 and 52 is a substantially rectangularly shaped block formed from a frictional material such as steel wool or a similar metal alloy material. Each brake pad includes a convex outer surface 53 for engaging a confronting surface of a rotary brake drum (not shown), and a concave inner surface 54 which faces and mates with the convex surface 31 of the brake shoe table 13 in a tight seated engagement with the adhesive sheet engaged therebetween. As illustrated in FIGS. 1 and 2, the brake pads are of a length and width slightly less than the length and width of the brake shoe table.

A series of fastener openings 56 (FIG. 1) are formed through the brake pads. The fastener openings 56 of the brake pads 51 and 52 are generally cylindrically shaped bores arranged in groups 57 with the number of fastener openings of each group 57 corresponding to the number of fastener openings in each group 39 formed through the brake shoe table 13, and are aligned with the fastener openings 38 formed through the brake shoe table. As shown in FIG. 2, each of the fastener openings 56 includes a cylindrical recess 58 (shown in dashed lines) formed adjacent the upper surface of the brake pads and a cylindrical lower bore 59 (shown in dashed lines) of a substantially smaller diameter than recess 58 extending from the recess 58 through the lower surface of each brake pad.

As illustrated in FIGS. 1 and 2, a series of fasteners 61 are inserted through each of the aligned fastener openings 56 and 38 of the brake pads and brake shoe table, respectively, to secure the brake pads 51 and 52 to the brake shoe table 13. The fasteners typically are rivets or bolts, although other conventional fastening means also can be used. Each fastener 61 includes a head portion 62 and a shank portion 63 depending from the head of each fastener. The fasteners are inserted into the fastener openings with the shank 63 of each fastener 61 extending through the cylindrical recesses 58 and lower bores 59 of the fastener openings of the brake pads and through the fastener openings of the brake shoe table. The fastener shanks 63 are secured at their opposite ends as by flattening the ends of the shank portions, if rivets are used, or by the use of a locking means such as a nut where bolts are employed.

As illustrated in FIG. 2, the head portion 62 of each fastener is received within the cylindrical recesses 58 formed in the brake pads 51 and 52, seated within the recesses. Such a seating engagement of the fasteners within the recesses of the brake pads insures that the fasteners are not engaged by the confronting frictional surface of the brake drum with the engagement of the brake pads against the brake drum during braking. Thus, the fasteners securely mount the brake pads to the brake shoe table.

To construct the brake shoe assembly with sealing liner 10 as illustrated in FIG. 1, one of the peelable backing layers 47 or 48 is removed from one side of the adhesive sheet to expose a first adhesive face thereof. The exposed adhesive face of the adhesive sheet is positioned over and engages the convex surface 31 of the brake shoe table. The adhesive sheet 45 is pressed tightly against the convex surface of the brake shoe table 13, urging any air bubbles from between the adhesive sheet and the brake shoe table and covering the convex surface 31 of the brake shoe table in substantially complete adhesive contact with an adhesive film approximately 5 ml. thick. Once the adhesive sheet has been applied to the brake shoe table, openings 46 are formed through the adhesive sheet 45, aligned with the fastener openings formed through the brake shoe table. Generally, fastener openings 38 are formed through the brake shoe table adjacent the side edges 33, 34, 36, and 37 of the brake shoe table as by drilling during the manufacture of the brake shoe prior to the application of the adhesive sheet to the brake shoe table. However, it is also possible to first apply the adhesive sheet and thereafter form the openings through the adhesive sheet at the same time the fastener openings are formed in the brake shoe table.

Once the fastener openings 38 and the openings 46 have been formed through the brake shoe table and adhesive sheet sealing liner as desired, the backing layer 47 or 48 (FIG. 3) covering the second adhesive face of the adhesive sheet is removed to expose the second adhesive face. The installer then positions the brake pads 51 and 52 (FIG. 1) of a friction brake liner 50 over the brake shoe table with the concave inner surfaces 54 of the brake pads positioned in facing relationship with the convex surface 31 of the brake shoe table. The installer positions the brake pads such that the fastener openings 56 formed through the brake pads are aligned with the fastener openings 38 formed through the adhesive sheet and brake shoe table. Once the fastener openings 56 of the brake pads have been so aligned, the brake pads are urged against the adhesive sheet 45 into tight adhesive contact with the adhesive sheet and into mating engagement with the convex surface 31 of the brake shoe table 13.

As the brake pads are pressed against the convex surface of the brake shoe table, the adhesive material of the adhesive sheet 45 is urged toward the side edges of the brake shoe table. The adhesive material of the adhesive sheet flows and spreads to fill any gaps between the concave surfaces 54 of the brake pads 51 and 52 and the convex surface 31 of the brake shoe table, due to any slight differences in the radius of curvature of each of these components. This spreading of the adhesive is further enhanced by the insertion of fasteners 61 through the aligned fastener openings 56 and 38 of the brake pads and brake shoe table. As the fasteners 61 are secured, as shown in FIG. 2, adjacent the concave surface 32 of the brake shoe table, the concave inner surfaces 54 of the brake pads are pulled into tighter adhesive contact with the convex surface of the brake shoe table.

The adhesive sheet 45 substantially covers the convex surface of the brake shoe table, filling any gaps between the concave inner surfaces 54 of the brake pads 51 and 52 and the convex surface 31 of the brake shoe table 13. The adhesive sheet thus functions as a sealing liner to create a moisture barrier between the brake pads and the brake shoe table. This moisture barrier retards the passage of moisture and corrosive elements such as salt and grime through the brake pads and into contact with the brake shoe table to prevent rust and corrosion of the brake shoe table. Thus, there usually is no necessity for coining or reworking the brake shoe table to achieve a tighter sealing fit between the friction brake liner and the brake shoe table.

The ability of the adhesive material of the adhesive sheet to remain pliable and substantially fluid at the high temperatures created during braking of the vehicle enables the adhesive sheet to flow and move over the brake shoe table to fill and seal any gaps formed by the shifting of the brake pads on the brake shoe table during braking. Additionally, by remaining pliable, the adhesive material is kept from solidifying and cracking, as occurs with conventional epoxies, to retard the creation of gaps between the brake pads and the brake shoe table. Thus, the seal between the brake shoe table and the friction brake liner is maintained even under extreme temperatures and stress created during braking. The adhesive sheet also provides an additional adhesive bond between the brake pads and the brake shoe table to further secure the brake pads and brake shoe table together in tight adhesive contact sealed against the passage of moisture and vapors therethrough. By inhibiting rust and corrosion of the brake shoe table, the useful life of the brake shoe and the brake shoe assembly itself is extended, resulting in cost savings.

It will also be understood that while the adhesive sheet typically is applied to the convex upper surface of the brake shoe table prior to attachment of the friction brake liner to the brake shoe table, it is also possible to apply an adhesive sheet to the concave surfaces of the brake pads of the friction brake liner before attaching the brake pads to the brake shoe table.

In some instances, the brake shoe is manufactured by one manufacturer and sold to another company that mounts the brake liner to the brake shoe. It will thus often be the customer or installer who will apply friction brake liners. Accordingly, the brake shoes can be shipped to the customers with the adhesive sheets unattached or already applied to the brake shoe table, or the complete assembly can be formed by the manufacturer.

While the foregoing invention has been described in the form of a preferred embodiment, it will be understood by those skilled in the art that numerous modifications, variations, and changes may be made thereto without departure from the spirit and scope of the invention as set forth in the following claims.

I claim:

1. A brake shoe assembly for a drum brake comprising:
   a brake shoe having an arcuate web and an arcuate brake shoe table mounted to said web;
   a friction liner overlaid onto said brake shoe table for frictionally engaging a confronting surface of a brake drum during braking;
   means attaching said friction liner to said brake shoe table; and
   a sealing liner positioned between said brake shoe table and said friction liner sealing said brake shoe table against moisture and for retarding corrosion of said brake shoe table, said sealing liner comprising a substantially moisture impermeable double faced adhesive flexible film sized to substantially cover the facing surfaces of said brake shoe table and said friction liner and which is capable of remaining substantially fluid under extreme heat such that the adhesive of said film tends to flow and fill any irregularly shaped gaps formed between said friction liner and said brake shoe table when compression and heat are applied to the film as the brake shoe is urged against the rotating brake drum during a braking operation to maintain a substantially unbroken moisture impermeable seal between said brake shoe table and said friction liner.

2. The brake shoe assembly of claim 1 and wherein said friction liner comprises a pair of resilient plates formed of a metal.

3. The brake shoe assembly of claim 1 and wherein said means for attaching said friction liner to said brake shoe comprises fasteners extended through said brake liner and into said brake shoe table.

4. The brake shoe assembly of claim 3 and wherein said friction liner and said brake shoe table each include a series of bores through which said fasteners are received, with said bores of said friction liner aligned with said bores of said brake shoe table.

5. In a drum brake assembly including a brake shoe having a substantially arcuate web and a brake shoe table mounted to the arcuate web, and an arcuate friction brake liner attached to the brake shoe table by fasteners, the improvement therein comprising:
   a double faced adhesive sealing liner applied to the brake shoe table, substantially covering at least the facing surfaces of the brake shoe table and the friction brake liner for forming a substantially vapor and moisture impermeable barrier between the friction brake liner and the brake shoe table, said sealing liner being formed from an adhesive material which remains substantially fluid under heat and pressure created during braking such that said adhesive material tends to flow into and fill any irregularly shaped gaps formed between the brake shoe table and the friction brake liner to uniformly seal at least the portion of the brake shoe table facing said friction brake liner against moisture and to retard rust and corrosion thereof.

6. The brake shoe assembly of claim 5 and wherein said sealing liner is a double-sided adhesive film having a pair of adhesive faces.

7. The brake shoe assembly of claim 5 and further including a plurality of bores formed through the friction brake liner and the brake shoe table, with said bores of the friction brake liner aligned with said bores of the brake shoe table for the insertion of the fasteners therethrough.

8. The brake shoe assembly of claim 7 and wherein said sealing liner includes a plurality of guide openings aligned with the bores of the brake shoe table for aligning the bores of the friction brake liner therewith.

9. A brake shoe assembly for a drum brake assembly, comprising:
   a brake shoe having an arcuate web and an arcuate brake shoe table mounted to said web;
   a friction liner overlaid onto said brake shoe table for frictionally engaging a confronting surface of a brake drum during braking;

means for attaching said friction liner to said brake shoe table; and a sealing liner positioned between said brake shoe table and said friction liner and sealing the surface of said brake shoe table facing said liner against moisture and for retarding corrosion of said brake shoe table, said sealing liner comprising adhesive material capable of remaining pliable under extreme heat and capable of flowing into and filling any irregular gaps between said friction liner and said brake shoe table to maintain a substantially moisture impermeable barrier therebetween and to uniformly seal the portion of the brake shoe table facing the friction liner from contact with moisture, wherein said sealing liner is a double-sided adhesive film having adhesive surfaces facing said brake shoe table and said friction liner.

10. The brake shoe assembly of claim 9 and wherein said means for attaching said friction liner to said brake shoe comprises fasteners extended through said brake liner, said sealing liner and into said brake shoe table.

11. The brake shoe assembly of claim 10 and wherein said friction liner and said brake shoe table each include a series of bores through which said fasteners are received, with said bores of said friction liner aligned with said bores of said brake shoe table.

* * * * *